UNITED STATES PATENT OFFICE.

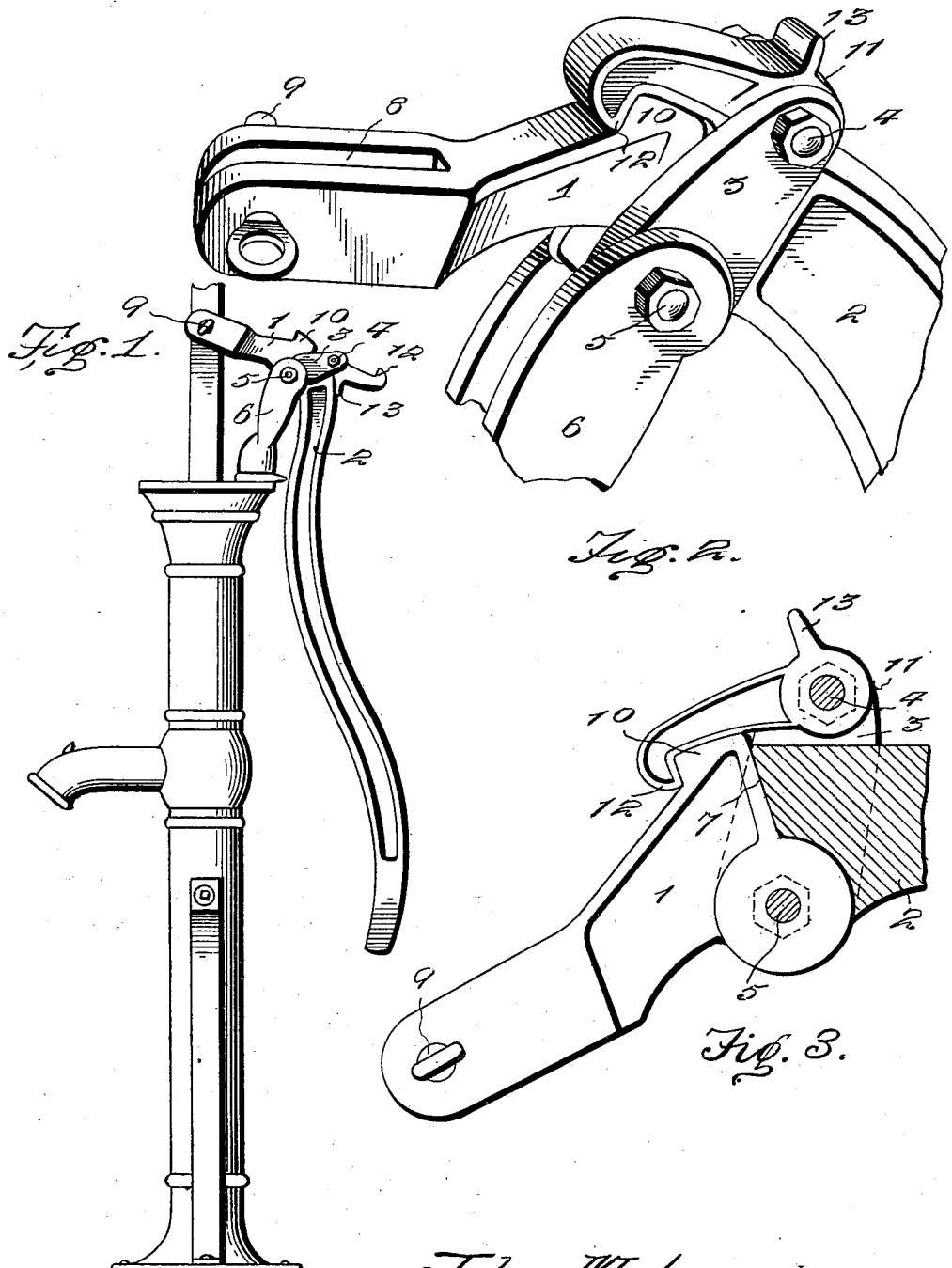

JOHN M. LOWE, OF BUTLER, INDIANA, ASSIGNOR OF ONE-THIRD TO GEORGE L. ROW, OF BUTLER, INDIANA.

PUMP-HANDLE.

SPECIFICATION forming part of Letters Patent No. 698,720, dated April 29, 1902.

Application filed January 18, 1902. Serial No. 90,322. (No model.)

*To all whom it may concern:*

Be it known that I, JOHN M. LOWE, a citizen of the United States, residing at Butler, in the county of Dekalb and State of Indiana, have invented a new and useful Pump-Handle, of which the following is a specification.

My invention is an improved pump-handle adapted for use on that class of pumps which are operated by windmills or other motors, the object of my invention being to provide an improved handle by means of which the pump may be also manually operated when the windmill or other motor is not in operation; and with this object in view my invention consists in the peculiar construction and combination of devices hereinafter fully set forth and claimed.

In the accompanying drawings, Figure 1 is a side elevation of a pump of ordinary form provided with a handle embodying my improvements. Fig. 2 is a detail perspective view showing the upper portion of the handle, the arm which is pivoted thereto, the dog to lock the arm to the handle, and a fulcrum-piece to which the handle is pivoted. Fig. 3 is a detail elevation, partly in section.

In the embodiment of my invention I provide an arm 1, which is pivotally or otherwise flexibly connected to the handle 2, and which arm is adapted to be attached to a pump-rod or to a pitman or slide-rod when the pump is operated by a windmill or other motor, and which arm is thereby adapted to oscillate independently of the handle and permit the latter to remain at rest when the pump is operated by the windmill or other motor. In the embodiment of my invention here shown the handle 2 is provided at its upper end with a pair of lugs or ears 3, which project both upwardly and downwardly therefrom and are provided at their respective upper and lower portions with openings for bolts 4 5, respectively. The bolt 5 forms the fulcrum of the handle and is attached in practice to a fulcrum-piece 6 of any suitable form, according to the make of pump on which the handle is used. The arm 1 is pivoted at its inner end on the said bolt 5, and the opposing ends of the arm and handle, which are adapted to abut against each other, as at 7, Fig. 3, when the handle is raised, are here shown as being disposed radially with reference to the bolt 5, which forms the fulcrum of the handle and the pivotal connection between the latter and the arm. Hence the pivotal axis of the arm is coincident with that of the fulcrum of the handle. The arm 1 is here shown as having its outer end slotted, as at 8, to receive the pump-rod, pitman, or slide-rod, and a pin 9 is provided to pivotally connect the pump-rod, pitman, or slide-rod to the outer end of said arm. The latter has a shoulder 10 formed on its upper side at its inner end. I also provide in the form of my invention here shown a dog 11, which is pivotally connected to the handle 2 by the bolt 4. The said dog has a shouldered head 12, which is adapted to engage the shoulder 10 of the arm 1 when the dog is turned to the position shown in Fig. 2 of the drawings to lock the arm 1 to the handle 2, with their opposing ends 7 in contact with each other, and thereby inflexibly connect the arm 1 to the handle 2, so that the arm will be oscillated when the handle is manually operated to actuate the pump-rod. The dog 11 is here shown as provided near its inner end with a lug 13, which when the dog is turned to disengage the shoulder 10 of the arm 1, as shown in Fig. 1 of the drawings, bears on the outer side of the handle and supports the dog; but the said lug may within the scope of my invention be omitted, and I do not desire to limit myself in this particular. Neither do I desire to limit myself to the precise construction and combination of devices herein shown and described, as it is evident that other modifications may be made therein without departing from the spirit of my invention.

It will be understood that when the pump is operated manually and the handle 2 is in requisition the pump-rod must be disconnected from the pitman or slide-rod of the windmill or other motor. Any suitable means may be employed for thus disconnecting the pump-rod from the pitman or slide-rod; but the same is not here shown, as it forms no part of this invention.

Having thus described my invention, I claim—

1. A pump-handle having a pivoted arm projecting beyond the fulcrum thereof and adapted to be attached to a pump-rod or pitman, whereby the handle and pivoted arm may be oscillated independently of each other, and means to lock the arm to the handle to adapt the same to be operated thereby, substantially as described.

2. A pump-handle having an arm flexibly jointed thereto and adapted to be attached to a pump-rod or pitman, and a dog to connect the pump-handle and arm, and adapt the latter to be operated by the former, substantially as described.

3. The combination of a pump-handle and an arm pivoted thereto, the axes of said pivot and the fulcrum of the handle being coincident, the opposing ends of the handle and arm being adapted to abut against each other, and means to lock the handle to the arm, substantially as described.

In testimony that I claim the foregoing as my own I have hereto affixed my signature in the presence of two witnesses.

JOHN M. LOWE.

Witnesses:
C. W. BEECHLER,
A. S. KESTER.